Nov. 3, 1936.  K. P. KENWORTHY  2,059,361
COLOR SCREEN HOLDER
Filed Aug. 5, 1935
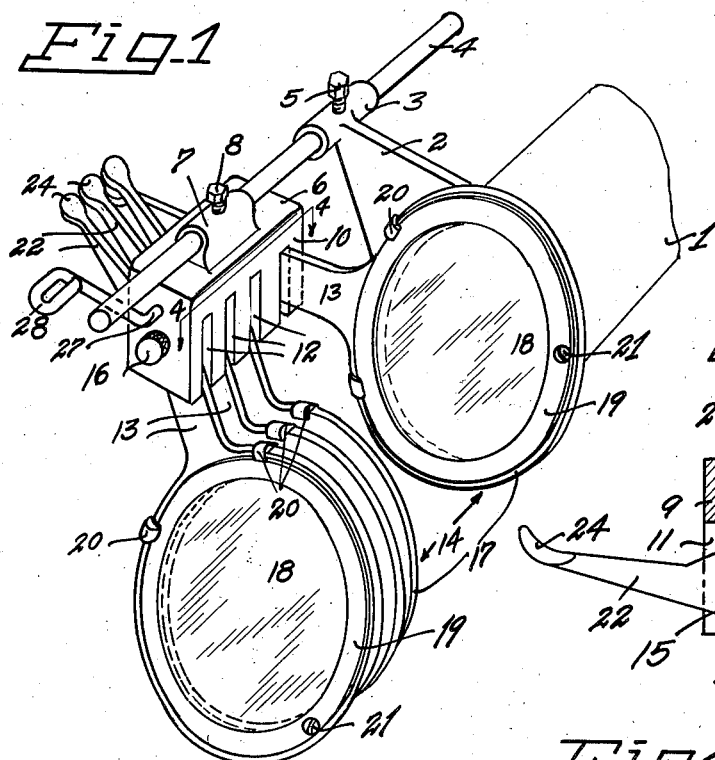
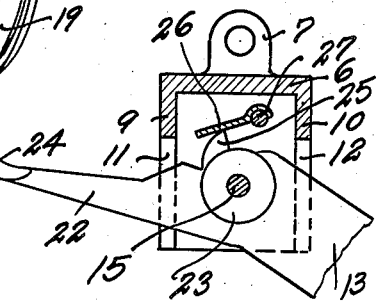
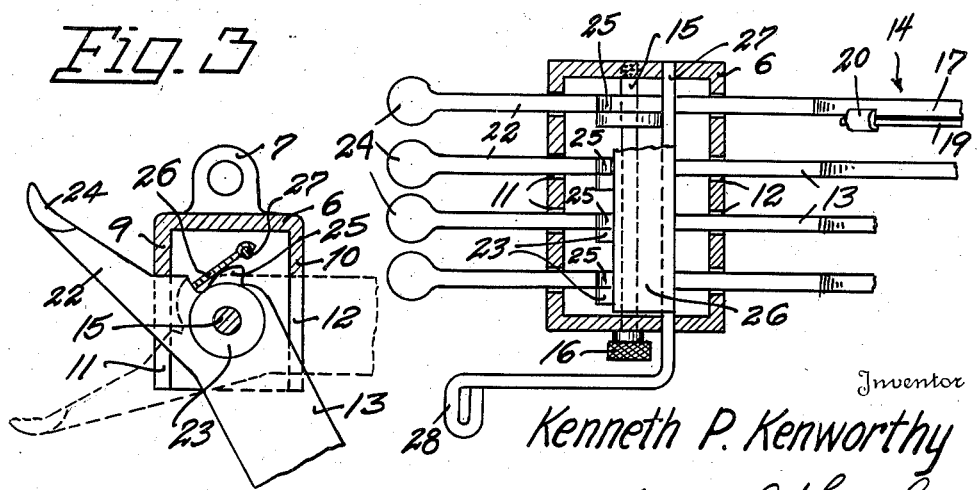
Inventor
Kenneth P. Kenworthy
By Glenn S. Fish
Attorney Patented Nov. 3, 1936

2,059,361

UNITED STATES PATENT OFFICE 2,059,361

COLOR SCREEN HOLDER

Kenneth P. Kenworthy, Moscow, Idaho

Application August 5, 1935, Serial No. 34,782

3 Claims. (Cl. 240—3.1)

This invention relates to an improved color screen for a light projector which may be a projector for moving or still pictures, a spot light such as used in theatres, a search light, or any other light projector with which it may be desired to associate means for changing the color of the light projected therefrom.

One object of the invention is to provide a device of this character which may be easily applied to the lens of a projector and adjusted to dispose it in proper relation to the lens.

Another object of the invention is to provide a device which includes a housing or mounting adapted to be supported in advance of the lens and a plurality of screens of different colors so connected with the housing that they may be normally supported out of an operative position and individually moved into position for use in front of the lens.

Another object of the invention is to permit more than one screen to be swung into an operative position in front of the lens and thus cause the light to pass through a plurality of screens.

Another object of the invention is the provision of improved means for releasably holding the screens in position for use in front of the lens consisting of a latch of such construction that the screens may have individual engagement with the latch as they are swung into their operative positions and all of the screens simultaneously released when the latch is moved to a releasing position.

Another object of the invention is to automatically release one or more screens when in an operative position by raising another screen. This action causes the latch plate to be raised out of engagement with the teeth and allows the screens to drop to the inoperative position.

Another object of the invention is to provide a device of this character which is simple in construction, easy to operate and not liable to get out of order.

The invention is illustrated in the accompanying drawing, wherein:

Figure 1 is a perspective view showing the improved color screen applied to the lens of a light projector of a conventional construction.

Figure 2 is a sectional view taken transversely through the housing of the device with the shank of a screen partially moved from a depending position to a raised position for use.

Figure 3 is a view similar to Figure 2 showing the screen in its depending position in full lines and in its raised position in dotted lines.

Figure 4 is a sectional view taken longitudinally through the housing upon the line 4—4 of Figure 1.

This improved color screen is intended for use in connection with a light projector of a conventional construction which includes a lens mounting member 1, a portion of which has been shown in Figure 1. In order to mount the device in operative relation to the lens there has been provided a bracket 2 which projects from the lens mounting member at one side thereof and may be secured to the barrel of the lens in any manner desired. This bracket is provided at its outer end with a sleeve or bearing 3 through which a supporting rod 4 is engaged and in order to secure the rod in an adjusted position there has been provided a set screw 5. Therefore, the rod may be longitudinally adjusted so that it projects forwardly beyond the lens a desired distance and firmly but releasably secured in a set position when the screw is tightened.

A mounting or housing 6 is disposed under the forward portion of the rod and at its top carries a bearing 7 which is formed integral with the housing and fits snugly about the rod. A set screw 8 is carried by the bearing and when tightened holds the housing in a set position. By this arrangement, the housing may be shifted along the rod to its proper position in advance of the front end of the lens and may also be adjusted about the rod and the set screw 8 then tightened to firmly secure it in the adjusted position. The housing is hollow and open at its bottom and its side walls 9 and 10 formed with slots 11 and 12 which lead from their lower edges so that the shanks 13 of screens 14 may have swinging movement from the position shown in full lines in Figure 3 to the raised position indicated by dotted lines in this figure.

The shanks are loosely mounted upon a pivot pin or shaft 15 extending through the housing longitudinally thereof and at its front end having a head 16 by means of which it can be grasped and, after being thrust into place, turned to screw its threaded rear end portion into a socket formed in the rear wall of the housing. The outer ends of the shanks 13 carry circular rings or frames 17 in which are placed sheets 18 of colored glass or other light penetratable material bordered by metal rings 19 and it will be readily understood that when one of the screens is swung upwardly to the raised or operative position in front of the lens 1, light from the lens must pass through the screen and will be tinted according to the color of the sheet 18. Lugs 20 carried by the frame 17 overlap the metal ring of the sheet 18 and together with the screw 21 securely but detachably hold the rings and colored sheets in the frames. It will thus be seen that sheets of any color desired may be mounted in the frames of the screens and changed when desired. A handle 22 extends from the inner end of the shank of each screen diagonally thereof and an enlargement or hub 23 is formed upon each shank about the shaft 15 so that a wide bearing surface will be provided and the shank caused to turn easily and be prevented from having tilting movement longitudinally of the shaft out of its proper position at right angles to the longitudinal axis thereof.

Normally, the screens are disposed in a depending position as the group of screens are shown in Figure 1, and when one is to be used, pressure is applied to the flattened finger engaging portion 24 at the outer end of the handle 22. This causes the shank to swing upwardly from the position shown in full lines in Figure 3 to that indicated by dotted lines and the tooth 25 at the inner end of the shank moves under and raises the latch plate 26 until the latch plate can drop into place in front of the straight cut edge face of the tooth and secure the shank in its raised position. The colored disk of the screen will be supported in front of the light projecting lens and light passing through the disk will be tinted. The latch plate is carried by a shaft 27 journaled longitudinally through the housing and having its forward end portion projecting from the housing and bent to form a crank handle 28 by means of which the shaft can be turned to raise the plate out of engagement with the tooth of the raised shank and allow the screen to drop to its normal position.

The screens may be individually or collectively moved upwardly to an operative position by applying pressure to the finger engaging portion 24. This action will cause the tooth 25 to engage the under side of the latch plate 26 thus forcing the plate upwardly and releasing any screen or screens that may be in the operative position. Thus a quick change can be accomplished without the aid of the crank handle 28. However to clear the lens of all screens the handle 28 is raised.

A very efficient device of this character has thus been provided which is simple in construction, easy to operate, and not liable to get out of order.

Having thus described the invention, what I claim is:

1. A device of the character described comprising a rod, means for mounting the rod longitudinally of a light projector, at the front thereof, a housing carried by said rod and depending therefrom, said housing being open at its bottom and having side walls slotted vertically, a pivot rod extending longitudinally through the housing, screens having shanks extending transversely in the housing and engaged through the slots of one side wall thereof, the shanks being pivoted upon the pivot rod and provided with handles extending through the slots of the other side wall of the housing, whereby pressure may be applied to the handles to swing the screens upwardly to a raised position for use, a tooth at the junction of each shank with its handle, and a latch carried by said housing and individually engageable by the teeth for holding the screens in a raised position, the latch being movable into position to release the teeth and permit return of the screens to a lowered position.

2. A device of the character described comprising a rod, means for mounting the rod longitudinally of a light projector at the front thereof, a housing carried by said rod and depending therefrom, said housing being open at its bottom and having side walls slotted vertically, a pivot rod extending longitudinally through the housing, screens having shanks extending transversely in the housing and engaged through the slots of one side wall thereof, the shanks being pivoted upon the pivot rod and provided with handles extending through the slots of the other side wall of the housing, whereby pressure may be applied to the handles to swing the screens upwardly to a raised position for use, a tooth at the junction of each shank with its handle, and a latch carried by the housing and consisting of a shaft journaled through the housing longitudinally thereof with a portion projecting through an end wall thereof and bent to form a crank handle, and a blade carried by the shaft within the housing and movable with the shaft into and out of position to engage the teeth of the shanks and releasably hold the screens in a raised position for use.

3. In a device of the character described, a housing, screens having shanks pivotally mounted in the housing and provided with handles projecting from the housing whereby pressure may be applied to the handles to swing the screens to a position for use, a tooth at the junction of each shank with its handle, and a latch carried by the housing and consisting of a shaft rotatably mounted and adapted to be turned, and a blade carried by said shaft and movable therewith into and out of position to engage the teeth of the shanks and releasably hold the screens in position for use.

KENNETH P. KENWORTHY.